US010794877B2

(12) United States Patent
Knight

(10) Patent No.: US 10,794,877 B2
(45) Date of Patent: Oct. 6, 2020

(54) SORBENT TUBE APPARATUS

(71) Applicant: EnDet Limited, Market Drayton (GB)

(72) Inventor: Jeremy Knight, Market Drayton (GB)

(73) Assignee: EnDet Limited, Market Drayton (GB)

(*) Notice: Subject to any disclaimer, the term of this patent is extended or adjusted under 35 U.S.C. 154(b) by 282 days.

(21) Appl. No.: 15/571,254

(22) PCT Filed: May 5, 2016

(86) PCT No.: PCT/GB2016/051286
§ 371 (c)(1),
(2) Date: Nov. 1, 2017

(87) PCT Pub. No.: WO2016/178022
PCT Pub. Date: Nov. 10, 2016

(65) Prior Publication Data
US 2018/0128791 A1 May 10, 2018

(30) Foreign Application Priority Data

May 5, 2015 (GB) .................................. 1507688.8

(51) Int. Cl.
*G01N 30/60* (2006.01)
*B01D 15/22* (2006.01)
(Continued)

(52) U.S. Cl.
CPC ........... *G01N 30/606* (2013.01); *B01D 15/22* (2013.01); *G01N 1/405* (2013.01); *G01N 30/08* (2013.01);
(Continued)

(58) Field of Classification Search
CPC ........ G01N 1/405; G01N 30/60; G01N 30/08; G01N 30/6052; G01N 2030/085; B01D 15/22
See application file for complete search history.

(56) References Cited

U.S. PATENT DOCUMENTS 3,440,864 A 4/1969 Blume
5,381,699 A * 1/1995 Dansereau ............. G01N 1/405
73/863.23
(Continued)

FOREIGN PATENT DOCUMENTS

DE 2739860 A1 3/1979
DE 19821812 A1 12/1999
(Continued)

OTHER PUBLICATIONS

International Search Report and Written Opinion issued in International Application No. PCT/GB2016/051286 dated Jul. 25, 2016 (5 pages).
(Continued)

*Primary Examiner* — Christopher Adam Hixson
(74) *Attorney, Agent, or Firm* — Zeller IP Group, PLLC; Serge Kriminus

(57) ABSTRACT

A sorbent tube apparatus (10) for high-pressure fluid sample analysis, the sorbent tube apparatus (10) comprising a pressurisable housing (32) having first and second fluid ports (48a, 48b) and defining a fluid chamber (34) therein; and a sorbent tube (12) mountable within the pressurisable housing (32), the sorbent tube (12) extending from one of the first and second fluid ports (48a) and spaced apart from the other of the first and second fluid ports (48b) to be in fluid communication with the fluid chamber (34), thereby enabling in use pressure equalisation between the sorbent tube (12) and fluid chamber (34). A method of analysing high-pressure fluid, an analytic probe apparatus, a further sorbent tube apparatus and method of preventing or limiting damage to a sorbent tube during high-pressure fluid sampling are also provided.

17 Claims, 2 Drawing Sheets

Figure 1:
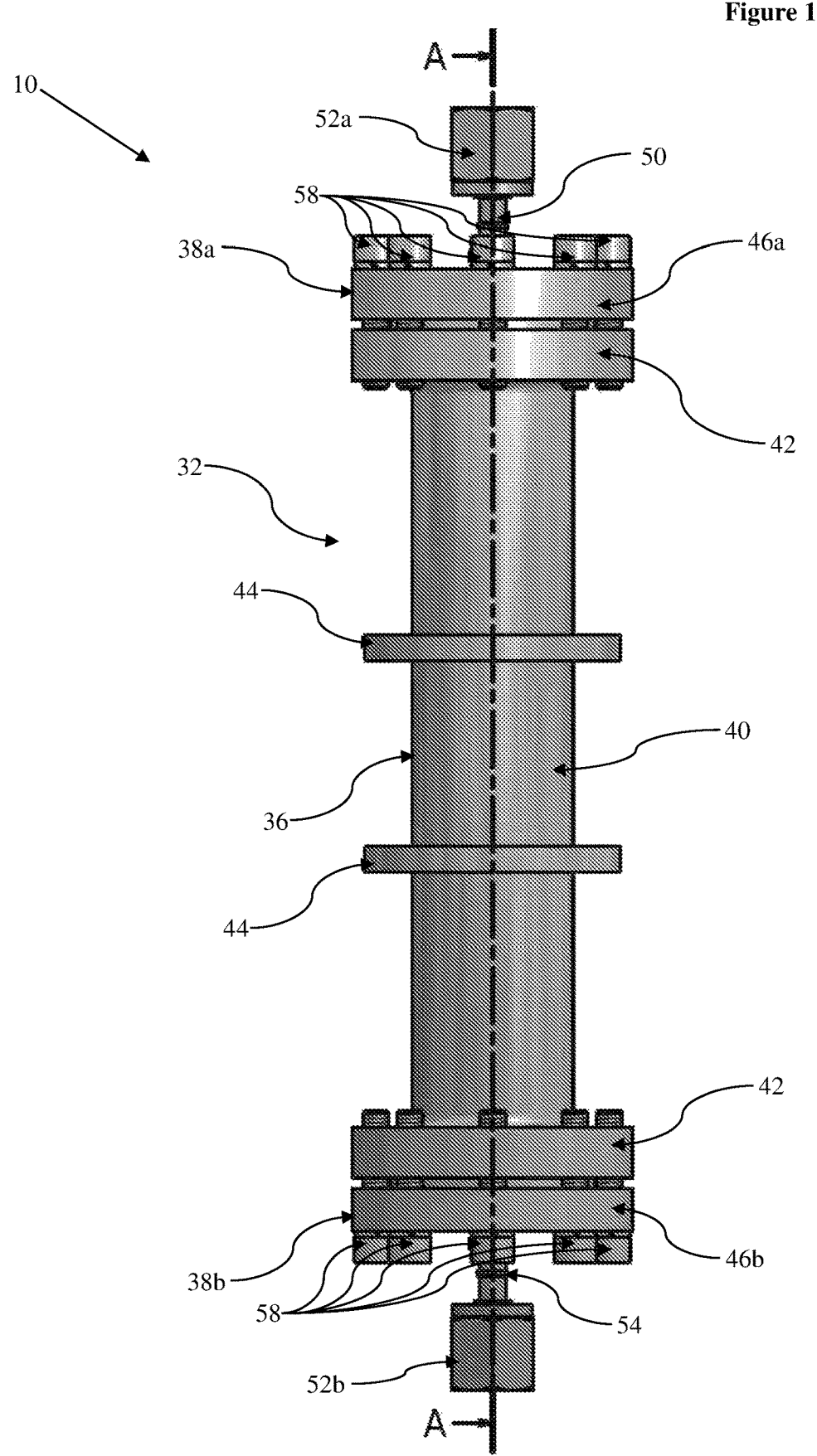

(51) Int. Cl.
*G01N 1/40* (2006.01)
*G01N 30/08* (2006.01)
*G01N 30/52* (2006.01)

(52) U.S. Cl.
CPC .......... *G01N 30/60* (2013.01); *B01J 2220/54* (2013.01); *G01N 30/6052* (2013.01); *G01N 2030/085* (2013.01); *G01N 2030/522* (2013.01)

(56) References Cited

U.S. PATENT DOCUMENTS

| | | | |
|---|---|---|---|
| 5,582,723 | A | 12/1996 | Boone et al. |
| 5,736,036 | A * | 4/1998 | Upchurch .............. B01D 15/22 210/198.2 |
| 2003/0235515 | A1 | 12/2003 | Fike |

FOREIGN PATENT DOCUMENTS

| | | |
|---|---|---|
| DE | 10030668 A1 | 1/2001 |
| WO | 03/083433 A2 | 10/2003 |

OTHER PUBLICATIONS

Search Report under Section 17 issued in British Application No. GB1507688.8 dated Feb. 17, 2016 (1 page).

\* cited by examiner

SORBENT TUBE APPARATUS

The present invention relates to a sorbent tube apparatus and in particular to an apparatus suitable for use with high-pressure fluid flow systems. The invention also relates to a method of using such an apparatus with a high-pressure fluid-flow system, and also to a generalised analytic monitor apparatus. Furthermore, the invention relates to a further sorbent tube apparatus and method of preventing or limiting damage to a sorbent tube during high-pressure fluid sampling.

One means of measuring trace analytes in a fluid system is by providing a sorbent, or solid-adsorbent, trap, formed as a glass tube having a sorbent material inserted therein. This is used, in particular, for measuring trace levels of mercury in processed or unprocessed natural gas, methane or similar hydrocarbon gases.

To measure the trace analytes, the sorbent tube is inserted inline into, for instance, the pipe manifold of the fluid-flow system, ensuring a consistent and steady flow across the sorbent material. This provides for accurate measurements of the trace analytes.

However, glass is a fragile material, and if the pressure in the fluid-flow system is increased much above atmospheric pressure, then there is a significant risk of uncontrolled or explosive decompression of the sorbent tube, shattering the glass. Not only does this require costly reinstallation of the sorbent tube in order for the fluid-flow system to become operational once more, but there is also the risk of shattering or exploding glass, or of hazardous gases leaking, in a manner which may be dangerous for a user in the vicinity.

It is an object of the present invention to provide a means for safely analysing trace analytes using a sorbent tube within a high-pressure; that is, above-atmospheric pressure, fluid-flow system.

According to a first aspect of the invention there is provided a sorbent tube apparatus for high-pressure fluid sample analysis, the sorbent tube apparatus comprising: a pressurisable housing having first and second fluid ports and defining a fluid chamber therein; and a sorbent tube mountable within the pressurisable housing, the sorbent tube extending from one of the first and second fluid ports and spaced apart from the other of the first and second fluid ports to be in fluid communication with the fluid chamber, thereby enabling in use pressure equalisation between the sorbent tube and fluid chamber.

By allowing fluid communication between the inside of a sorbent tube and a sealed chamber enclosing the sorbent tube, it is possible to equalise the internal and external pressures to the sorbent tube. This advantageously minimises the risk of uncontrolled decompression of the fragile, typically glass, tube body.

In a preferred embodiment, the sorbent tube may be mounted so as to be cantilevered to the said one first or second fluid ports, and preferably the said other of the first or second fluid ports may be positioned in alignment with a free end of the sorbent tube.

By mounting the sorbent tube only at one of its ends, it becomes relatively straightforward to permit equalisation of the internal and external pressures. Additionally and advantageously, because the sorbent tube is not rigidly held within the housing, the sorbent tube is potentially less prone to being damaged unintentionally due to collisions. This improves the robustness of the apparatus, beneficially reducing the likelihood of failure. Furthermore, by aligning the second, output fluid port with the second end of the sorbent tube, the disruption to the fluid flow dynamics within the fluid flow system caused by the interruption to the enclosure of the fluid flow pathway is minimised.

The apparatus may further comprise a mounting connector engagable with the sorbent tube and the said one of the first or second fluid ports, which may be a mounting sleeve. Additionally or alternatively, the sorbent tube may be directly mountable to an inside surface of the housing.

A mounting sleeve is a relatively gentle means of engaging the sorbent tube to the first, inlet port of housing, ensuring that the sorbent tube remains affixed in position without risk of dislocation, whilst also avoiding excessive radial forces on the tube body which might cause shattering. Other mounting means are, of course, possible.

Preferably, the housing may comprise a housing body element and a housing cap element, the housing body element and housing cap element being releasably interengagable.

By allowing for a pressure vessel or housing which can be readily opened, assembly and/or installation of the sorbent tube into the assembly is simplified. If the sorbent tube becomes damaged or must be replaced in use, then the housing cap elements can be removed to permit access to the broken or damaged tube.

At least one of the first and second fluid ports may be integrally formed with said housing cap element. Optionally, the said housing cap element may be screw-threadably engagable with the housing body element.

Positioning the fluid ports at or adjacent to the housing cap element or elements allows for the ready extraction of a damaged or sorbent tube, since the sorbent tube will likely be engaged with one or other of the fluid ports. Similarly, screw-threaded engagement between component parts facilitates simple extraction of the sorbent tube therein.

Preferably, two said housing cap elements may be provided which are releasably engagable with the housing body element, in which case, each of the first and second fluid port may be integrally formed with one of the said housing cap elements.

Providing two housing cap elements allows for bespoke housing cap elements to be produced: the first having an inlet pipe which is engagable with the sorbent tube; the second having a recessed outlet providing the necessary separation between the sorbent tube and the fluid outlet so as to permit pressure equalisation in the fluid chamber.

Ideally, the housing may be openable to permit user access to the sorbent tube.

By having a housing which is openable in some form, the sorbent tube can be readily removed for maintenance or replacement purposes. In use, the apparatus, having the sorbent tube inside the housing may be installed in a test location. A fluid sample then flows through the fluid chamber therein and the necessary sample is then collected in the sorbent tube inside the housing. The apparatus as a whole, or the sorbent tube alone, may then be retrieved or uninstalled from the test location for analysis offsite, for example in a laboratory. The sorbent tube is typically removed from the housing for analysis. After analysis, a new or fresh sorbent tube may be installed inside the housing of the apparatus to allow a fresh sample to be collected in a different or the same test location. Thus the apparatus is reusable, which makes the arrangement cost effective and environmentally friendly.

The sorbent tube apparatus may further comprise a first pipe connection element engagable with the first fluid port and/or a second pipe connection element engagable with the second fluid port, and if so, the first pipe connection element and/or second pipe connection element may be releasably engagable with the first fluid port and/or second fluid port. The first pipe connection element and/or second pipe connection element may be a screw-threaded pipe manifold connection element.

By providing pipe connection elements which are attached to the sorbent tube apparatus, it may be possible to provide a sorbent tube installation device; a sealed unit containing a sorbent tube which can be installed in situ without the need for the installer to handle awkward and fragile components, such as the sorbent tube, directly.

According to a second aspect of the invention there is provided a method of analysing a high-pressure fluid sample using a sorbent tube, the method comprising the steps of: a] providing a sorbent tube apparatus as claimed in any one of the preceding claims; b] connecting the first and second fluid ports into a fluid-flow system such that the fluid sample flows across the sorbent tube; and c] pressurising the fluid sample such that the fluid pressure in the fluid chamber and the sorbent tube is equalised.

By providing a means of equalising the pressure inside and outside of the installed sorbent tube, the risk of uncontrolled decompression leading to shattering of the sorbent tube is minimised. This advantageously reduces the frequency of failed sampling and thus the need to replace the broken sorbent tube in a high-pressure fluid flow system.

Preferably, the housing of the sorbent tube apparatus is openable. The method may further comprise, subsequent to step c], of steps: d] disconnecting the first and second fluid ports from the fluid-flow system; and e] demounting the sorbent tube from the housing for analysis. Furthermore, the method may further comprise, subsequent to step e], of step f] mounting a fresh or unsampled sorbent tube within the housing ready for sampling a fresh high-pressure fluid sample. Step e] and/or step f] of the method may occur in a location away from the fluid-flow system.

According to a third aspect of the invention, there is provided an analytic monitoring apparatus for high pressure fluid sample analysis, the analytic monitoring apparatus comprising: a pressurisable housing having first and second fluid ports defining a fluid chamber therein; and an analytic monitor mountable inside the fluid chamber, the analytic monitor having an inner volume which is in fluid communication with the fluid chamber to permit pressure equalisation between the analytic probe and fluid chamber.

The invention as described for a sorbent tube is equally applicable for other analytic probe systems which may utilise fragile probes which would otherwise become damaged in high-pressure fluid-flow systems.

According to a fourth aspect of the invention, there is provided a sorbent tube apparatus for high pressure fluid sample analysis, the sorbent tube apparatus comprising: a pressurisable housing defining a fluid chamber therein; and a sorbent tube having a discharge opening within the pressurisable housing, thereby enabling in use pressure equalisation between the sorbent tube and fluid chamber.

According to a fifth aspect of the invention, there is provided a method of preventing or limiting damage to a sorbent tube during high-pressure fluid sampling, the method comprising the step of: discharging a fluid to be sampled from the sorbent tube directly into a pressurisable housing, thereby equalising the pressure between the sorbent tube and fluid chamber.

Figure 2:
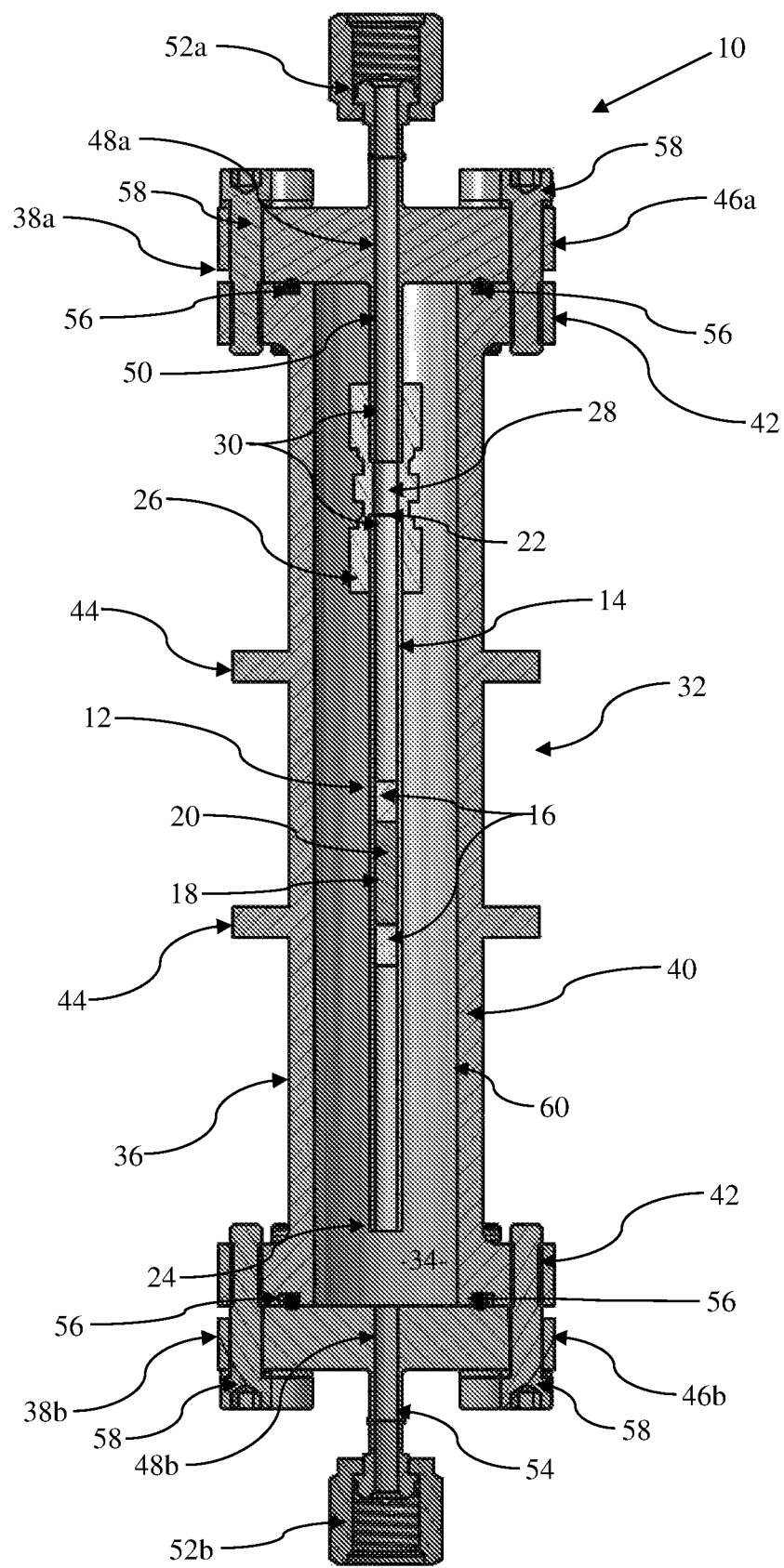

The invention will now be more particularly described, by way of example only, with reference to the accompanying drawings, in which:

FIG. 1 shows a plan view of one embodiment of a sorbent tube apparatus in accordance with the first aspect of the invention; and FIG. 2 shows a cross-sectional representation of the sorbent tube apparatus of FIG. 1 along line A-A.

Referring to FIGS. 1 and 2, there is shown a sorbent, or solid-adsorbent, tube apparatus, indicated globally at 10, for securing a sorbent tube 12 in position as part of a high-pressure fluid-flow system.

The sorbent tube 12 itself is formed comprising an elongate, preferably or typically glass, tube body 14 having two spacer portions 16 positioned inside the tube body 14 close to a longitudinal centre of the tube body 14 to define a central chamber 18. Within the central chamber 18 is positioned a sorbent material 20, which, for the illustrated mercury trap, is a gold-coated quartz sand.

Numerous types of sorbent material are known, however, such as activated charcoal, silica gel or organic porous polymers, and any suitable type of sorb ent tube could feasibly be utilised with the present invention.

The tube body 14 has openings at first and second longitudinal ends 22, 24 which define a fluid inlet and fluid outlet of the sorbent tube 12, allowing fluid to be passed through the tube body 14 and across the sorbent material 20 such that analytes can be adsorbed onto the sorbent material 20. At the first end 22 there is positioned a protective mounting sleeve 26 around the outside of the tube body 14, allowing the sorbent tube 12 to be mounted without damaging the fragile tube body 14.

The protective mounting sleeve 26 is here formed as a substantially cylindrical connector having a longitudinal bore 28 therethrough. At either end of the bore 28 is provided a pipe acceptance region 30, into which a pipe of a given diameter can be accepted. The sorbent tube 12 is accepted into the mounting sleeve 26 by inserting the first end 22 into one of the pipe acceptance regions 30 in the depicted embodiment, but other means of mounting sorbent tubes 12 are known, such as clamps utilising screw-threaded fasteners, and such mounting means could be considered here.

The sorbent tube 12 is installed within a pressure vessel or other pressurisable housing 32, which defines a fluid chamber 34 about the sorbent tube 12, illustrated in the cross-section through line A-A as shown in FIG. 2. The housing 32 in the embodiment of the sorbent tube apparatus 10 as illustrated is formed having a housing body element 36 and first and second housing cap elements 38a, 38b. It will, however, be appreciated that the form of the housing 32 is merely for illustrative purposes, and that the size and shape of the fluid chamber 34 could be altered as desired.

The housing body element 36 is preferably formed as an elongate tube 40 having sufficient internal volume so as to cover the full length of the sorbent tube 12 once inserted. At either end of the tube 40 is provided a circular flange 42 via which the housing body element 36 can engage with the housing cap elements 38a, 38b. As illustrated, mounting ribs 44 may also be provided affixed to the outside of the housing body element 36 to assist with mounting and/or alignment of the sorbent tube apparatus 10 following assembly.

The first housing cap element 38a is formed having a first flange body 46a engagable with the corresponding flange 42 of the housing body element 36, through which is formed a first fluid port 48a permitting fluid access into the fluid chamber 34. The first fluid port 48a here has an inlet pipe 50 which extends through the first flange body 46a and projects into the fluid chamber 34 when the first housing cap element 38a is engaged with the housing body element 36. The inlet pipe 50 is here shown as being integrally formed with the first housing cap element 38a, but it will be apparent that this could be formed as a feed-through with a discrete seal instead.

At an external end of the inlet pipe 50 is provided a first pipe connection element 52a, which is here formed as a screw-threaded pipe manifold connection element, and allows the first fluid port 48a to be connected to a fluid-flow system.

The second housing cap element 38b is formed so as to be similar to the first housing cap element 38a; it has a second flange body 46b which is engagable with a flange 42 of the housing body element 36 through which is formed a second fluid port 48b. The second fluid port 48b has an outlet pipe 54 which does not project into the fluid chamber 34 in use, but which is connected to a second pipe connection element 52b to allow the outlet pipe 54 to also be integrated into the fluid-flow system.

Each of the first and second flange bodies 46a, 46b of the first and second housing cap elements 38a, 38b are here releasably engagable with the housing body element 36; as illustrated, the seal between the housing body element 36 and housing cap elements 38a, 38b is achieved using O-ring sealing elements 56, with the flanges 42, 46a, 46b being respectively secured in place using screw-threaded fasteners 58. It will be appreciated, however, that many means for fastening flanges together are known, for instance, using copper gaskets between flanges which are releasably bolted together, or by welding flanges to one another for non-releasable engagement.

To assemble the sorbent tube assembly 10, the user engages the first end 22 of the sorbent tube 12 into one pipe acceptance region 30 of the mounting sleeve 26. The inlet pipe 50 of the first housing cap element 38a is then inserted into the opposing pipe acceptance region 30 of the mounting sleeve 26.

The first housing cap element 38a is attached to the housing body element 36 such that the sorbent tube 12 is received within the fluid chamber 34 defined by the housing body element 36, the second end 24 of the sorbent tube 12 being untethered such that the sorbent tube 12 is cantilevered at its first end 22. If desired, however, the tube body 14 of the sorbent tube 12 could additionally or alternatively be supported using framework inserted within or attached to an inside surface 60 of the housing body element 36.

The second housing cap element 38b can then be attached to the housing body element 36, such that the second fluid port 48b is substantially in-line with the second end 24 of the sorbent tube 12. A fluid flow path along axis A-A, as shown in FIG. 1, is therefore defined by the inlet pipe 50, through the first fluid port 48a, through the bore 28 of the mounting sleeve 26, through the tube body 14 and sorbent material 20 of the sorbent tube 12, out of the second end 24 of the sorbent tube 12 and towards the second fluid port 48b and outlet pipe 54.

Critically, however, there is a discharge opening from the second end 24 of the sorbent tube 12 of this fluid flow path within the fluid chamber 34, in this embodiment between the second end 24 of the sorbent tube 12 and the second fluid port 48b, which is in fluid communication with the sealed fluid chamber 34. This ensures that the fluid sample is able to flow into and fill the fluid chamber 34 in use.

By providing the fluid chamber 34 which encompasses the sorbent tube 12 so as to be in fluid communication with the inside of the tube body 14, the respective fluid pressures of these two regions is equalised, or substantially equalised depending on the fluid flow dynamics within the fluid chamber 34, by discharging the sample fluid from the sorbent tube directly into the fluid chamber 34 of the pressurisable housing 32. As such, the internal and external pressures of the sorbent tube 12 are identical or closely matched, and therefore the net pressure on the tube body 14 is minimised. This mitigates the risk of uncontrolled decompression resulting in damage to the sorbent tube 12 in use.

In use, the sorbent tube apparatus 10, having the sorbent tube 12 already installed therein, is connected to the fluid-flow system to be tested. A fluid sample then flows through the fluid chamber 34 of the apparatus 10 and the necessary sample is then collected in the sorbent tube 12 inside the housing 32. The apparatus 10 may then be uninstalled from the test location for analysis offsite, for example in a laboratory. The sorbent tube 12 is removed from the housing 32 in the laboratory for analysis, typically under atmospheric pressure. A new or fresh sorbent tube 12 can thus be installed inside the housing 32 of the apparatus 10 to allow a fresh sample to be collected in a different or the same test location. Therefore, the apparatus 10 is reusable, which makes the device cost effective and environmentally friendly. Insertion of the new sorbent tube 12 is done preferably offsite in the laboratory, but may also be done onsite at the test location just prior to installation of the apparatus 10.

It will be appreciated that although it is preferable to remove the complete apparatus 10 for analysis offsite such that the sorbent tube 12 is protected in transit, it is possible to uninstall only the sorbent tube 12 therein, thus allowing the housing 32 to remain connected to the fluid-flow system.

Whilst the fluid dynamics of such a system are such that it is preferable to provide opposed first and second fluid ports which are closely associated with each of the first and second ends of the sorbent tube when installed, it is possible to provide a fluid chamber having a single housing cap element, with both of the first and second fluid ports being installed therein. In this case, the standard sorbent tube could be provided, with the natural pressure of the sample fluid forcing the fluid through the second fluid port and outlet pipe, or a bespoke arcuate sorbent tube might be considered.

Furthermore, whilst the sorbent tube is illustrated as being mounted so as to be cantilevered from the first fluid port, that is, the inlet pipe; it is equally possible to mount the sorbent tube from the outlet pipe. This could be achieved, for example, by reversing the flow direction in the depicted embodiment.

Additionally, it is potentially plausible that the sorbent tube could be solely mounted from the inside of the housing body element, potentially being slightly spaced-apart from both of the first and second fluid ports. In such a scenario, the fluid flow from the inlet pipe might be sufficient to force fluid through the sorbent tube.

It will be apparent that the present technique of providing a pressurisation chamber around an analytic monitor, here the sorbent tube, to permit the monitor to accept high-pressure fluid, could feasibly be provided for probes other than sorbent tubes, in particular for fragile monitors; thermocouples and pH probes, for instance, make use of glass probes.

Whilst the housing cap elements are shown as being engagable with the housing body element via mutually engagable flanges, it is possible to provide alternative means of connection. For example, the housing cap elements could be directly affixable to the housing body element via screw-threaded engagement.

As an alternative to housing cap elements, it may be possible to construct a housing or pressure vessel which is openable in some manner, for instance, via the housing body element. Such an opening may make replacement of a broken sorbent tube more straightforward.

It is therefore possible to provide a sorbent tube apparatus for high-pressure fluid sample analysis which comprises a housing so as to define a fluid chamber therein, and having first and second fluid ports to define a fluid flow pathway through the fluid chamber. A sorbent tube can then be mounted on the fluid flow pathway in a manner such that the fluid sample flows across the sorbent material contained therein, but whilst also being in fluid communication with the fluid chamber around the sorbent tube. This allows the pressure both internal and external to the sorbent tube to be equalised, limiting the probability of uncontrolled decompression of the sorbent tube The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention herein described and defined.

The invention claimed is:

1. A sorbent tube apparatus for high-pressure fluid sample analysis, the sorbent tube apparatus comprising:
    a pressurisable housing having first and second fluid ports and defining a fluid chamber therein; and
    a sorbent tube mountable within the pressurisable housing, the sorbent tube extending from one of the first and second fluid ports and spaced apart from the other of the first and second fluid ports to be in fluid communication with the fluid chamber, thereby enabling in use pressure equalisation between the sorbent tube and fluid chamber;
    further compromising a mounting sleeve having a bore and first and second pipe acceptance regions respectively at opposite ends of the bore, the first and second pipe acceptance regions being respectively engageable with the sorbent tube and the said one of the first or second fluid ports.

2. The sorbent tube apparatus as claimed in claim 1, wherein the sorbent tube is mounted so as to be cantilevered to the said one of the first or second fluid ports.

3. The sorbent tube apparatus as claimed in claim 2, wherein the said other of first or second fluid ports is positioned in alignment with a free end of the sorbent tube.

4. The sorbent tube apparatus as claimed in claim 1, wherein the sorbent tube is directly mountable to an inside surface of the housing.

5. The sorbent tube apparatus as claimed in claim 1, wherein the housing comprises a housing body element and a housing cap element, the housing body element and housing cap element being releasably interengageable.

6. The sorbent tube apparatus as claimed in claim 5, wherein at least one of the first and second fluid ports is integrally formed with said housing cap element.

7. The sorbent tube apparatus as claimed in claim 5, wherein the said housing cap element is screw-threadably engageable with the housing body element.

8. The sorbent tube apparatus as claimed in claim 5, wherein two said housing cap elements are provided which are releasably engageable with the housing body element.

9. The sorbent tube apparatus as claimed in claim 8, wherein each of the first and second fluid port is integrally formed with one of the said housing cap elements.

10. The sorbent tube apparatus as claimed in claim 1, wherein the housing is openable to permit user access to the sorbent tube.

11. The sorbent tube apparatus as claimed in claim 1, further comprising a first pipe connection element engageable with the first fluid port and/or a second pipe connection element engageable with the second fluid port.

12. The sorbent tube apparatus as claimed in claim 11, wherein the first pipe connection element and/or second pipe connection element is releasably engageable with the first fluid port and/or second fluid port.

13. The sorbent tube apparatus as claimed in claim 11, wherein the first pipe connection element and/or second pipe connection element is a screw-threaded pipe manifold connection element.

14. A method of analysing a high-pressure fluid sample using a sorbent tube, the method comprising the steps of:
    a) providing a sorbent tube apparatus having a pressurisable housing and first and second fluid ports and defining a fluid chamber therein, and a mounting sleeve having a bore and first and second pipe acceptance regions respectively at opposite ends of the bore, the first pipe acceptance regions being engagable with the first fluid port;
    b) mounting a sorbent tube to the mounting sleeve via the second pipe acceptance region, the sorbent tube extending from the first fluid port and spaced apart from the second fluid port;
    c) connecting the first and second fluid ports into a fluid-flow system such that the fluid sample flows across the sorbent tube; and
    d) pressurising the fluid sample such that the fluid pressure in the fluid chamber and the sorbent tube is equalised.

15. The method as claimed in claim 14, wherein the housing of the sorbent tube apparatus is openable and subsequent to step d), further comprises steps:
    e) disconnecting the first and second fluid ports from the fluid-flow system; and
    f) demounting the sorbent tube from the housing for analysis.

16. The method as claimed in claim 15, wherein subsequent to step f) further comprises step:
    g) mounting a fresh or unsampled sorbent tube within the housing ready for sampling a fresh high-pressure fluid sample.

17. The method as claimed in claim 15, wherein step f) occurs in a location away from the fluid-flow system.

* * * * *